United States Patent [19]
Olson

[11] 3,872,943
[45] Mar. 25, 1975

[54] DRIVE UNIT
[75] Inventor: Lloyd C. Olson, Beaverton, Oreg.
[73] Assignee: R. M. Wade & Co., Portland, Oreg.
[22] Filed: July 26, 1973
[21] Appl. No.: 382,716

[52] U.S. Cl......... 180/24.08, 180/24.09, 180/24.11, 180/44 R, 239/212
[51] Int. Cl.............................................. B62d 3/00
[58] Field of Search........... 239/212; 180/49, 24.08, 180/24.09, 24.11, 21, 44

[56] References Cited
UNITED STATES PATENTS

| | | | |
|---|---|---|---|
| 1,186,648 | 6/1916 | Chaquette | 180/49 |
| 2,228,581 | 1/1941 | Olen | 180/44 R |
| 2,665,941 | 1/1954 | Idler | 239/212 X |
| 2,927,654 | 3/1960 | Lee | 180/49 |
| 3,318,531 | 5/1967 | Funk | 239/212 |

*Primary Examiner*—Allen N. Knowles
*Attorney, Agent, or Firm*—Phillips, Moore, Weissenberger, Lempio & Strabala

[57] ABSTRACT

A wheeled drive unit for carrying and transporting a portion of an irrigation pipe includes an engine associated therewith. The engine connects to a hydrostatic transmission, to which in turn is connected a locked differential, from which extend drive shafts associated with wheels of the unit by means of shaft connections. Through such shaft connections, the engine drives the unit. In another embodiment of the invention, chain and sprocket means are used to transmit motion to the wheels of the unit.

8 Claims, 2 Drawing Figures

DRIVE UNIT

BACKGROUND OF THE INVENTION

In the movement of an elongated irrigation pipe, it is known to provide a mover unit along the length of the pipe for supporting and moving that portion of the pipe over the ground. Such a mover unit generally includes an engine, a transmission connected thereto, and chain and sprocket means which interconnect the transmission and wheels of the unit, for transmitting motion from the transmission to the wheels. Such a mover unit generally incorporates a fixed-ratio transmission for achieving a forward and a reverse speed.

While such a mover unit has been found to be relatively efficient in operation, it will be understood that improvements in such a unit are constantly being sought. For example, under certain applications, the fixed-ratio transmission of the prior art device has been found to be limiting, i.e., it has been found that it would be advantageous to incorporate some form of variable ratio transmission, to allow the mover unit to be adaptable for proper use under a wide variety of conditions. In addition, it has been found that while the above-mentioned chain and sprocket form of drive is relatively efficient in operation, such chain and sprocket drive is commonly exposed to a portion of the water being used for irrigation. It will be seen that, under such condition, the chain or chains involved may well become rusty and corroded, creating an unfavorable operating condition.

SUMMARY OF THE INVENTION

It is an object of the this invention to provide a drive unit for carrying and transporting a portion of an irrigation pipe which is capable of providing a wide variety of speed ratios to the wheels of the device, to insure efficient operation of the device over a wide variety of conditions.

It is a further object of this invention to provide a drive unit which, while fulfilling the above object, is of high efficiency in operation, meanwhile being extremely simple in design.

Broadly stated, the invention is a drive unit for carrying and transporting a portion of an irrigation pipe or the like. Such drive unit comprises a frame, and wheel means rotatably mounted to the frame and on which the frame is supported. A rotary prime mover is fixed relative to the frame, and a variable speed transmission is operatively connected to the prime mover. A locked differential is operatively connected to the transmission. Means interconnect the locked differential and wheel means for transmitting rotary motion to the wheel means for moving the drive unit.

BRIEF DESCRIPTION OF THE DRAWINGS

These and other objects of the invention will become apparent from a study of the following specification and drawings, in which.

DESCRIPTION OF THE PREFERRED EMBODIMENTS

Figure 1:
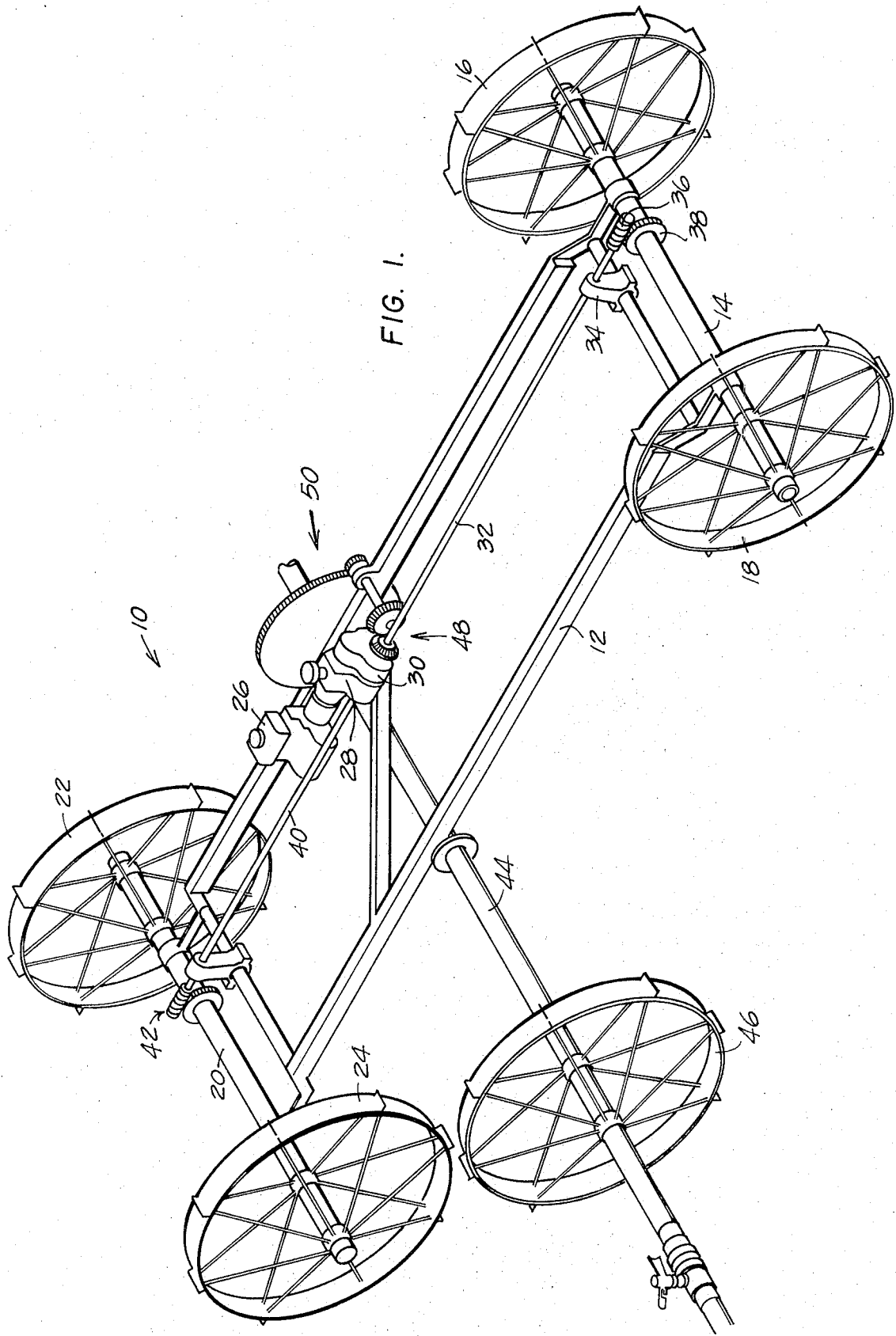
FIG. 1 is a perspective view of a first embodiment of the inventive drive unit.

Shown in FIG. 1 is a first embodiment of mover unit 10. Such mover unit 10 includes a rectangular frame 12. An axle 14 is rotatably fixed to the forward end of the frame 12, and has wheels 16,18 fixed to the opposite ends thereof, for rotation therewith. Similarly, an axle 20 is rotatably fixed to the rearward end of the frame 12, and has wheels 22,24 fixed to opposite ends thereof for rotation therewith. These wheels 16,18,22,24 act to support the frame 12.

A prime move 26 in the form of an engine capable of rotary output is fixed to the frame 12. A hydrostatic transmission 28, capable of variable speeds in forward and reverse, is operatively connected to the engine 26. The transmission 28 has fixed thereto and drives a locked differential 30.

A first shaft 32 extends from the locked differential 30 and transmission 28 forwardly thereof toward the axle 14. Such shaft 32 is driven through the transmission 28 and locked differential 30 to rotate along its longitudinal axis. The shaft 32 is rotatably supported by a support member 34 fixed to the frame 12, and has a worm member 36 fixed to its extended end and rotatable therewith. A gear 38 is fixed to the axle 14 between the wheels 16,18 and is in engagement with the worm member 36, so that rotation of the shaft 32 about its longitudinal axis drives the wheels 16,18 through the worm means 36,38.

A second shaft 40 extends from the locked differential 30 and transmission 28 rearwardly thereof toward the axle 20. The shaft 40 is supported in a manner similar to the shaft 32, and like worm and gear means 42 are included for driving the rear axle 20 and wheels 22,24 in a similar manner.

The frame 12 carries a portion of an irrigation pipe 44, which is supported along its length by a plurality of wheels (one shown at 46). A bevel gear system 48 is associated with the shaft 32, and connects with gear reduction means 50 which in turn connect to the irrigation pipe 44 to rotatably drive the pipe 44 and wheels 46 mounted thereon. In this way, wheels 16,18,22,24, and the wheels 46 supporting the irrigation pipe 44, are dirven so that the irrigation pipe 44 is transported over the ground.

Figure 2:
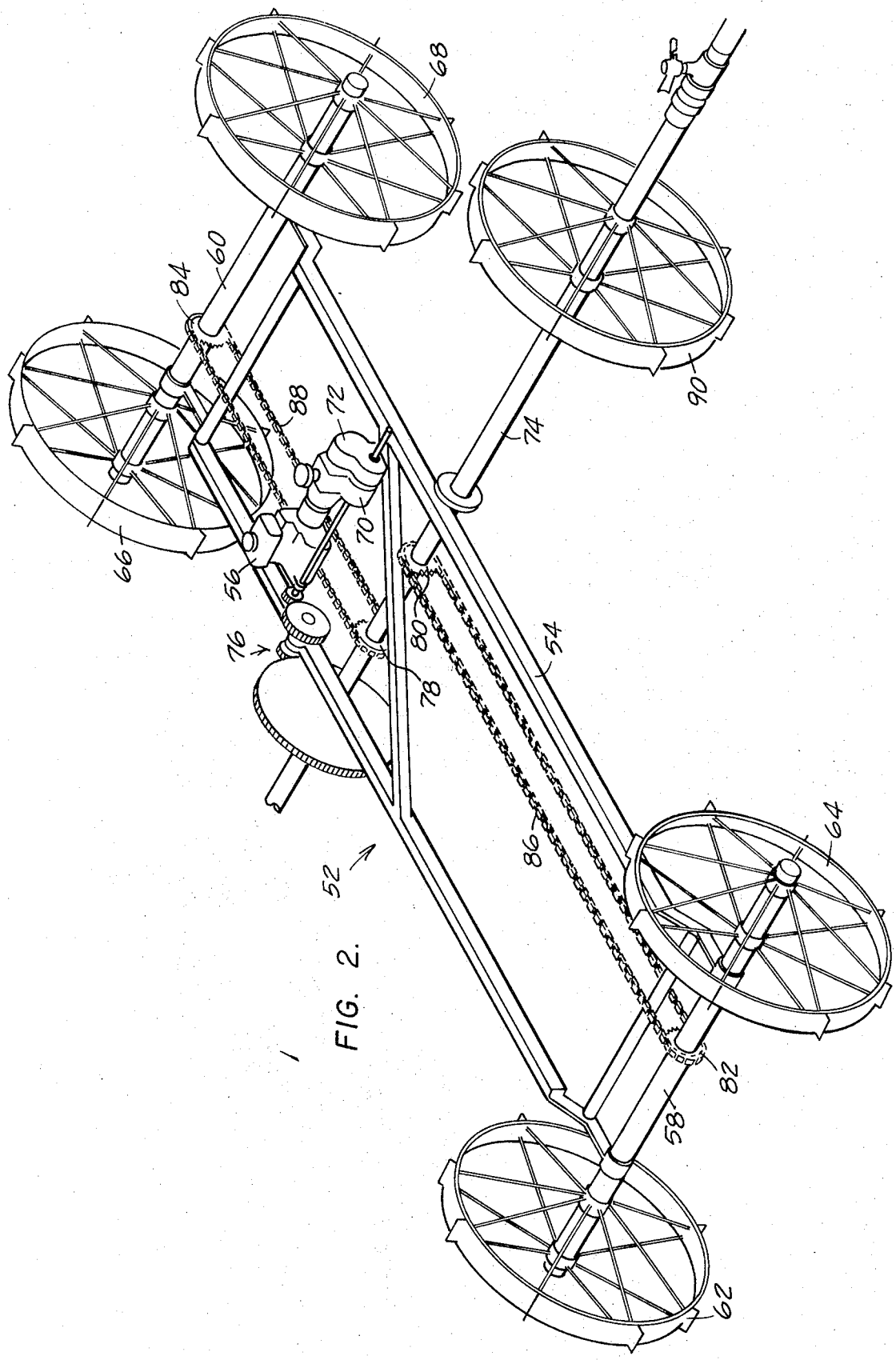
FIG. 2 is a perspective view of a second embodiment of the inventive drive unit.

FIG. 2 shows a second embodiment 52 of the invention which also includes a frame 54, an engine 56 mounted thereto, and forward and rearward axles 58,60 rotatably mounted to the frame 54. Wheels 62,64 are mounted to the opposite ends of the axle 58 for rotation therewith, and wheels 66,68 are mounted to the opposite ends of the axle 60 for rotation therewith. A variable speed hydrostatic transmission 70 is connected to the engine 56. The transmission 70 in turn connects to a locked differential 72. A portion of an irrigation pipeline 74 is rotatably supported by the frame 54, and is driven by the engine 56 through the hydrostatic transmission 70, the locked differential 72, and additional gear reduction means 76. The pipeline 74 has fixed thereto sprockets 78,80, and the axles 58,60 have sprockets 82,84 fixed respectively thereto. A drive chain 86 interconnects sprockets 82,84 and a drive chain 88 interconnects sprockets 78,84. Thus, the wheels 62,64,66,68, and the wheels which support the pipeline 74 (one shown at 90) are driven by means of the engine 56 to move the unit 52 over the ground.

It will be seen that in either embodiment, the use of a variable speed hydrostatic transmission allows the unit to be driven in a manner suited to any of a wide variety of conditions. The first-described embodiment includes the advantage of shaft and worm-and-gear drive means, eliminating the problem of rusting and corrosion of drive chains of a chain and sprocket drive system. In either embodiment, the use of a locked differential results in a high degree of compactness and efficiency.

What is claimed is:

1. A drive unit for carrying and transporting a portion of an irrigation pipe or the like comprising:
   a frame;
   wheel means rotatable mounted to the frame and on which the frame is supported;
   means on said frame supporting said irrigation pipe for rotation generally medially thereof, drive means on said pipe imparting rotation thereto,
   a rotary prime mover fixed relative to the frame;
   a variable speed transmission operatively connected to the prime mover;
   a locked differential operatively connected to the transmission;
   means for interconnecting the locked differential and wheel means for transmitting rotary motion to the wheel means for moving the drive unit, and said interconnecting means further including power take off means connected to said pipe drive means for driving the same.

2. The device of claim 1 wherein the means interconnecting the locked differential and wheel means comprise shaft means.

3. The drive unit of claim 1 wherein the means interconnecting the locked differential and wheel means comprise a shaft extending from the locked differential and rotatable about its longitudinal axis therefrom, a worm member fixed to the extended end of the shaft and rotatable therewith, and a gear fixed relative to and rotatable with the wheel means and in engagement with the worm member, so that rotation of the shaft about its longitudinal axis drives the wheel means through the worm member and gear.

4. The drive unit of claim 3 and further comprising an axle rotatably fixed to the frame, and wherein the wheel means comprise first and second wheels fixed to opposite ends of the axle, the gear being fixed to the axle between said first and second wheels.

5. The drive unit of claim 1 wherein the means interconnecting the locked differential and wheel means comprise chain and sprocket means.

6. The drive unit of claim 4 wherein the variable speed transmission comprises a hydrostatic transmission.

7. The drive unit of claim 5 wherein the variable speed transmission comprises a hydrostatic transmission.

8. The drive unit of claim 5 wherein said sprocket means comprises driving sprockets on said pipe and drive sprockets on said wheels means with said chains means disposed thereover and said power takeoff means being connected to said pipe sprockets for driving the same.

* * * * *